United States Patent
Shiozaki et al.

(10) Patent No.: US 12,066,669 B2
(45) Date of Patent: Aug. 20, 2024

(54) OPTICAL DEVICE

(71) Applicant: Sumitomo Electric Industries, Ltd., Osaka (JP)

(72) Inventors: Manabu Shiozaki, Osaka (JP); Tomoya Saeki, Osaka (JP); Katsumi Uesaka, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/507,633

(22) Filed: Oct. 21, 2021

(65) Prior Publication Data

US 2022/0128777 A1  Apr. 28, 2022

(30) Foreign Application Priority Data

Oct. 23, 2020  (JP) ................................. 2020-178441

(51) Int. Cl.
*H04B 10/00* (2013.01)
*G02B 6/42* (2006.01)

(52) U.S. Cl.
CPC ............. *G02B 6/421* (2013.01); *G02B 6/424* (2013.01); *G02B 6/4244* (2013.01)

(58) Field of Classification Search
CPC ...... G02B 6/421; G02B 6/424; G02B 6/4244; G02B 6/4206; G02B 6/4296; G02B 6/4204
See application file for complete search history.

(56) References Cited

U.S. PATENT DOCUMENTS

| | | | | |
|---|---|---|---|---|
| 4,119,362 A | * | 10/1978 | Holzman | G02B 6/32 385/74 |
| 4,919,506 A | * | 4/1990 | Covey | G02B 6/4204 385/35 |
| 5,323,268 A | * | 6/1994 | Kikuchi | G02B 3/0062 359/664 |
| 6,749,347 B1 | | 6/2004 | Ichihara et al. | |
| 8,693,825 B2 | * | 4/2014 | Sugrim | G02B 6/262 385/35 |
| 9,519,108 B1 | * | 12/2016 | Guiffault | G02B 6/3846 |
| 2002/0009261 A1 | * | 1/2002 | Bhagavatula | G02B 6/2552 385/35 |
| 2002/0197010 A1 | | 12/2002 | Kato et al. | |
| 2004/0156585 A1 | * | 8/2004 | Matusick | G02B 6/262 385/33 |
| 2006/0239605 A1 | * | 10/2006 | Palen | G02B 6/423 385/33 |
| 2012/0148193 A1 | * | 6/2012 | Sugrim | G02B 6/262 385/35 |

(Continued)

FOREIGN PATENT DOCUMENTS

JP  58-30185 A  2/1983
JP  2001-281501 A  10/2001

(Continued)

*Primary Examiner* — Agustin Bello
(74) *Attorney, Agent, or Firm* — McCarter & English, LLP; Michael A. Sartori

(57) ABSTRACT

Disclosed is an optical device including a first lens and a second lens. The first lens of the optical device is joined to an end surface of an optical waveguide of an optical element to emit light emitted from the optical element. The second lens is optically coupled with the first lens to convert the light emitted from the first lens into collimated light.

19 Claims, 13 Drawing Sheets

(56) References Cited

U.S. PATENT DOCUMENTS

| | | | |
|---|---|---|---|
| 2015/0370015 A1* | 12/2015 | Aoki | G02B 6/423 |
| | | | 385/14 |
| 2016/0327747 A1* | 11/2016 | Casasanta, III | G02B 6/30 |
| 2018/0100971 A1 | 4/2018 | Suzuki et al. | |
| 2018/0252874 A1* | 9/2018 | Moriyama | G02B 6/4478 |
| 2019/0170945 A1* | 6/2019 | Fortusini | G02B 6/13 |
| 2020/0081194 A1* | 3/2020 | Zhang | G02B 6/3882 |
| 2021/0066891 A1* | 3/2021 | Katagiri | H01S 5/0235 |
| 2021/0072468 A1* | 3/2021 | Uchiyama | H01S 5/02315 |
| 2022/0035111 A1* | 2/2022 | Morita | G02B 6/4239 |
| 2022/0054052 A1* | 2/2022 | Loach | G02B 6/4298 |
| 2022/0063031 A1* | 3/2022 | Ho | H01S 5/02476 |
| 2022/0075129 A1* | 3/2022 | Morita | G02B 6/44 |
| 2022/0128777 A1* | 4/2022 | Shiozaki | G02B 6/421 |
| 2022/0158737 A1* | 5/2022 | Tomita | H04B 10/40 |

FOREIGN PATENT DOCUMENTS

| | | |
|---|---|---|
| JP | 2003-4960 A | 1/2003 |
| JP | 2013-50586 A | 3/2013 |
| WO | 2017/002149 A1 | 1/2017 |

* cited by examiner

US 12,066,669 B2

OPTICAL DEVICE

TECHNICAL FIELD

The present disclosure relates to an optical device. This application is based upon and claims the benefit of priority from Japanese Patent Application No. 2020-178441, filed on Oct. 23, 2020, the entire contents of which are incorporated herein by reference.

BACKGROUND

JP2001-281501 discloses a laser diode module that optically couples a laser diode with an optical fiber. In this module, to introduce light emitted from the laser diode into the optical fiber, the laser diode and an incident end surface of the optical fiber are fixed in a predetermined positional relationship, and a lens for condensing light is provided between the laser diode and the optical fiber to be optically coupled with the laser diode and the optical fiber.

SUMMARY

An optical device according to an aspect of the present disclosure includes a first lens joined to an end surface of an optical waveguide of an optical element to emit light emitted from the optical element; and a second lens optically coupled with the first lens to convert the light emitted from the first lens into collimated light.

An optical device according to another aspect of the present disclosure includes a first lens joined to an end surface of an optical waveguide of an optical element to condense incident light that enters the optical element; and a second lens optically coupled with the first lens to convert collimated light into incident light that enters the first lens.

DETAILED DESCRIPTION

Figure 1:
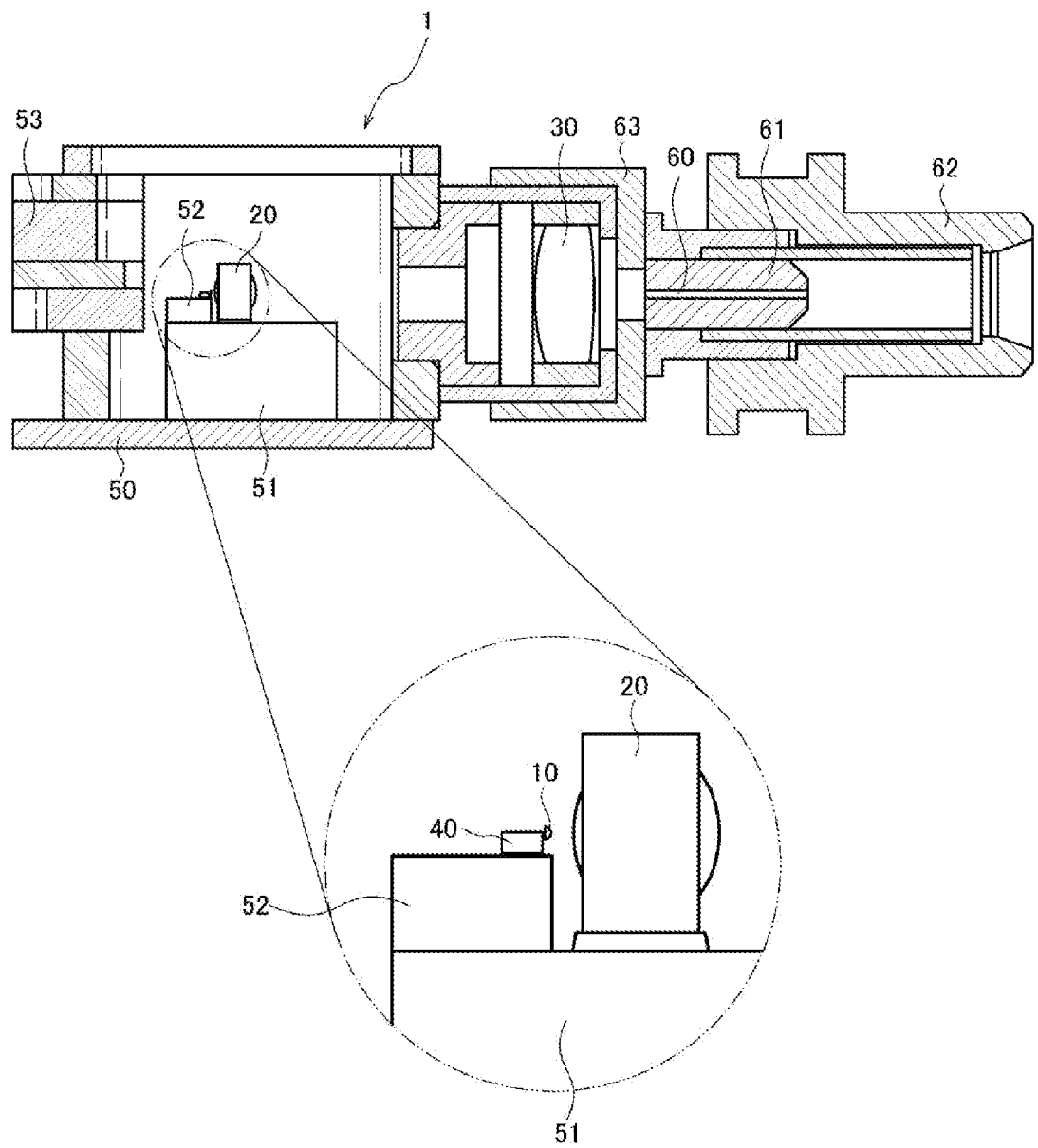
FIG. 1 is a view showing an example of an optical device according to an embodiment of the present disclosure.

Problems to be Solved by the Present Disclosure

In the laser diode module described in JP2001-281501, to efficiently guide light from the laser diode to the external optical fiber, it is required to position components such as the laser diode, the condensing lens, and the optical fiber with extremely high accuracy. Similarly, also in an optical circuit in which a large number of optical elements are densely integrated using an optical waveguide formed on a substrate, it is required to efficiently input light from the optical waveguide of the optical circuit to an external element, and further, to efficiently input light from the external element to the optical waveguide of the optical circuit. Therefore, an interface having good optical coupling efficiency with an external element is required.

Effects of the Present Disclosure

According to the present disclosure, it is possible to obtain an optical device having good optical coupling efficiency with the outside.

Description of Embodiments of the Present Disclosure

First, embodiments of the present disclosure will be listed and described. An optical device according to an embodiment of the present disclosure includes a first lens joined to an end surface of an optical waveguide of an optical element to emit light emitted from the optical element; and a second lens optically coupled with the first lens to convert the light emitted from the first lens into collimated light. As a result, it is possible to obtain an optical device having good optical coupling efficiency with the outside.

The optical device according to the embodiment of the present disclosure may further include a third lens configured to condense the collimated light emitted from the second lens; and an optical fiber optically coupled with the third lens to receive the condensed light emitted from the third lens. As a result, it possible to efficiently guide the light from the optical device to the optical fiber.

In the optical device according to the embodiment of the present disclosure, the optical element may include at least one of a laser element, an optical modulation element, and an optical amplification element. As a result, in an optical device provided with an optical element that releases light to the outside, it is possible to obtain an optical device having good optical coupling efficiency with the outside.

An optical device according to another embodiment of the present disclosure includes a first lens joined to an end surface of an optical waveguide of an optical element to condense incident light that enters the optical element; and a second lens optically coupled with the first lens to convert collimated light into incident light that enters the first lens. As a result, it is possible to obtain an optical device having good optical coupling efficiency with the outside.

The optical device according to the embodiment of the present disclosure may further include a third lens configured to make the collimated light enter the second lens; and an optical fiber optically coupled with the third lens to emit incident light that enters the third lens. As a result, it possible to efficiently guide the light from the optical fiber to the optical device.

In the optical device according to the embodiment of the present disclosure, the optical element may include at least one of an optical modulation element, a waveguide type light receiving element, and an optical amplification element. As a result, in an optical device provided with an optical element that receives light from the outside, it is possible to obtain an optical device having good optical coupling efficiency with the outside.

In the optical device according to the embodiment of the present disclosure, the first lens may be an aspherical lens having a curved surface protruding on a side opposite to the optical element. A region of the first lens joined to the end surface of the optical waveguide of the optical element may be formed in a plane orthogonal to an optical axis of the first lens. An area of the plane may be smaller than a maximum area of a cross section of the first lens orthogonal to an optical axis of the optical waveguide. As a result, a loss of light due to an aberration of the first lens can be suppressed.

In the optical device according to the embodiment of the present disclosure, in the first lens, assuming that a refractive index is n, a predetermined position on a surface adjacent to the optical element is a point O, an arbitrary position on a surface of the first lens other than the surface adjacent to the optical element is a point S, and a position of a virtual image formed by the first lens is a point P, a relationship in which a value obtained by subtracting a distance between the point S and the point P from a value obtained by multiplying a distance between the point O and the point S by the refractive index n is a constant value may be formed. As a result, a loss of light due to an aberration of the first lens can be suppressed.

In the optical device according to the embodiment of the present disclosure, an optical axis of the optical waveguide may be orthogonal to the surface adjacent to the optical element at a position of the point O of the first lens, and the position point P of the virtual image of the first lens may be on the optical axis of the optical waveguide. As a result, the first lens can be formed symmetrically with respect to the optical axis, which facilitates manufacturing.

In the optical device according to the embodiment of the present disclosure, an optical axis of the optical waveguide may be orthogonal to the surface adjacent to the optical element at a position of the point O of the first lens, and the position point P of the virtual image of the first lens may be located apart from the optical axis of the optical waveguide. As a result, it is possible to reduce the influence of the reflected return light on the surface of the first lens while suppressing a loss of light due to an aberration of the first lens.

In the optical device according to the embodiment of the present disclosure, the optical axis of the optical waveguide may be orthogonal to the surface adjacent to the optical element at a position other than the point O. As a result, it is possible to reduce the influence of the reflected return light on the surface of the first lens while suppressing a loss of light due to an aberration of the first lens.

In the optical device according to the embodiment of the present disclosure, the first lens may have at least a hemispherical portion on a side where the first lens is optically coupled with the second lens. As a result, the spread of the light released from the optical waveguide can be suppressed, and the power of the second lens can be reduced. In addition, a permissible value of the positioning accuracy at the time of installing each component can be increased.

In the optical device according to the embodiment of the present disclosure, a thickness of the first lens in an optical axis direction may be larger than a radius of curvature of the hemispherical portion. As a result, the image magnification of the first lens is increased, and the spread of light can be suppressed even in a case in which the beam diameter of the optical waveguide is small.

In the optical device according to the embodiment of the present disclosure, an optical axis of the first lens may be offset with respect to an optical axis of the optical waveguide of the optical element by half or more of a beam diameter of the optical waveguide of the optical element. As a result, it is possible to reduce the influence of the reflected return light on the surface of the first lens.

In the optical device according to the embodiment of the present disclosure, the first lens may be made of glass or a resin. As a result, choices for a lens material are increased. Further, in the case in which a resin is used, it is possible to form the first lens using a 3D printing technique.

Details of Embodiments of the Present Invention

Specific examples of the optical device according to the embodiments of the present disclosure will be described below with reference to the drawings. The present invention is not limited to the following examples, but is defined by the scope of the claims, and is intended to include meanings equivalent to the scope of the claims and all modifications within the scope. Further, as long as a plurality of embodiments can be combined, the present invention includes a combination of arbitrary embodiments. In the following description, description of components and the like having the same reference signs may be omitted because they are the same in different drawings.

First Embodiment

Figure 2:
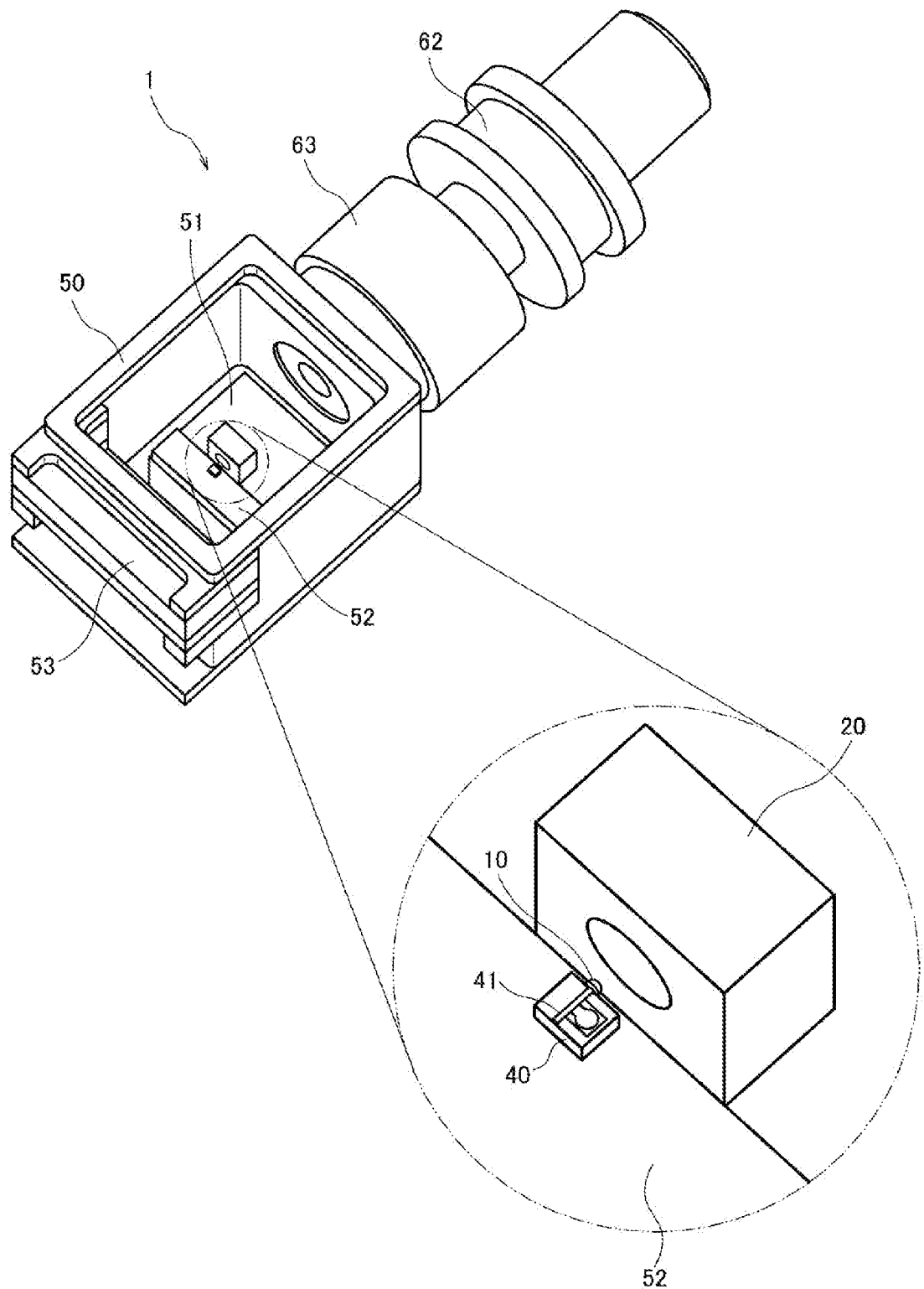
FIG. 2 is a perspective view of the optical device shown in FIG. 1.
Figure 3:
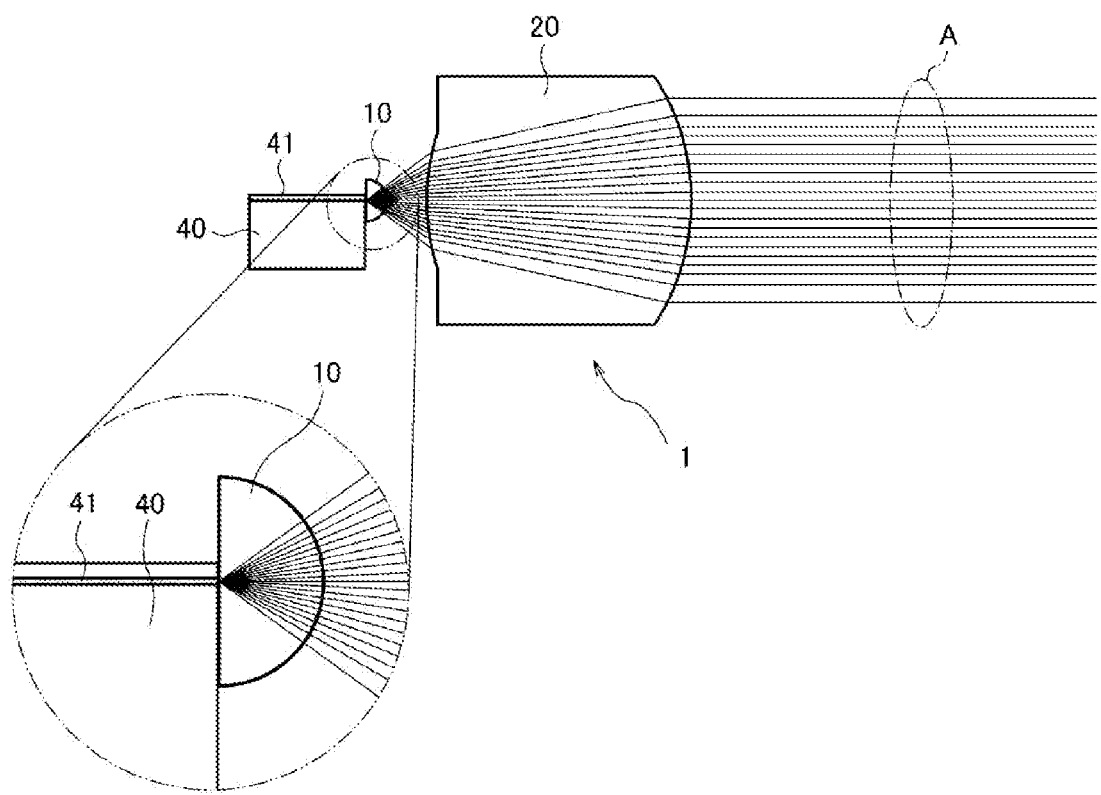
FIG. 3 is a view for explaining the spread of light from an optical waveguide in the optical device shown in FIG. 1.
Figure 4:
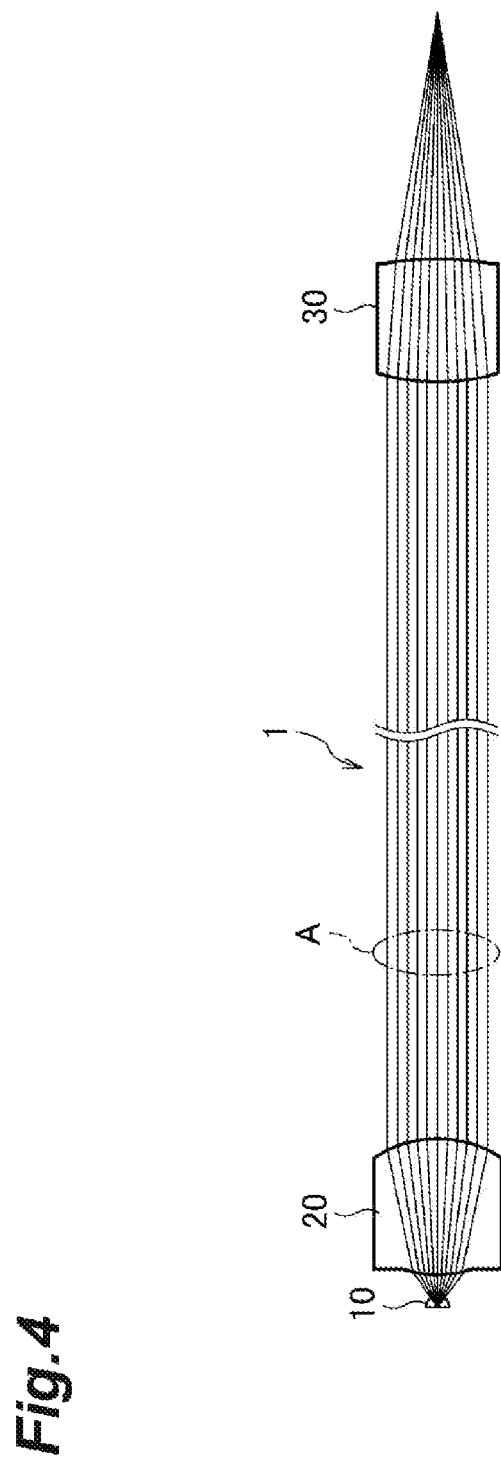
FIG. 4 is a view showing an optical path from an optical element to an optical fiber in the optical device shown in FIG. 1.

In the present embodiment, a laser element will be described as an example of an optical element used in an optical device, but as long as the optical element releases light from an optical waveguide to the outside, the optical element is not limited to the laser element and may be an optical modulation element or an optical amplification element. FIG. 1 is a view showing an example of an optical device according to an embodiment of the present disclosure. FIG. 2 is a perspective view of the optical device shown in FIG. 1. FIG. 3 is a view for explaining the spread of light from an optical waveguide in the optical device shown in FIG. 1. FIG. 4 is a view showing an optical path from an optical element to an optical fiber in the optical device shown in FIG. 1. In FIG. 4, the description of the optical element and the optical fiber is omitted.

An optical device 1 according to the present embodiment includes as a laser diode chip (hereinafter referred to as an "LD chip") 40 which is a laser element, a first lens 10, a second lens 20, a third lens 30, and an optical fiber 60 which is a single mode fiber (SMF), as constituent members of an optical system. The LD chip 40 is installed on a subcarrier 52 made of, for example, aluminum nitride which has a high thermal conductivity. The second lens 20 is a collimating lens that converts light that has entered from the first lens into collimated light which is a parallel beam, as will be described later, and is fixed on a carrier 51 together with the subcarrier 52 on which the LD chip 40 is installed. The carrier 51 is disposed in a package 50 formed using, for example, a Fe—Ni—Co alloy (for example, trade name Kovar) or the like. A drive signal of the LD chip 40 is supplied from the outside of the package 50 via a feedthrough 53.

The first lens 10 is formed of a resin and is provided to be joined to an end surface of an optical waveguide 41 of the LD chip 40. In a case in which the first lens 10 is formed of a resin, it is possible to manufacture the first lens 10 using a 3D printing technique. The first lens 10 and the second lens 20 are optically coupled, and the second lens is fixed on the carrier 51 in an aligned state with high accuracy using an adhesive such as an epoxy-based adhesive. The optical fiber 60 is positioned and held in a receptacle 62 while being housed in a ferrule 61. The third lens 30 is a condensing lens. The collimated light from the second lens 20 is condensed by the third lens 30 and is coupled with the optical fiber 60. The third lens 30 is housed in a holder 63 disposed outside the package 50. The third lens 30 and the optical fiber 60 are aligned to obtain optical coupling. The holder 63 and the package 50 are fixed by YAG welding, for example.

The LD chip 40 is an optical element having the optical waveguide 41. The LD chip 40 may be, for example, a semiconductor laser with an optical waveguide or a semiconductor laser having a double heterojunction. In the semiconductor laser having a double heterojunction, an active layer has a higher refractive index than a surrounding cladding layer to form an optical waveguide, and thus the semiconductor laser becomes an optical element having an optical waveguide. As shown in FIG. 3, in the present embodiment, the first lens 10 is formed as a hemispherical lens and is provided to be joined to the end surface of the optical waveguide 41 of the LD chip 40. An optical axis (a central axis) of the first lens 10 is provided without an offset to coincide with an optical axis of the optical waveguide 41 of the LD chip 40.

In the optical device 1, the first lens 10 is provided on the end surface of the optical waveguide 41 of the LD chip 40. Accordingly, as shown in FIG. 4, the light released from the optical waveguide 41 of the LD chip 40 is efficiently guided to the second lens 20 by the first lens 10. The light released from the LD chip 40 is converted into collimated light A by the second lens 20, is condensed by the third lens 30, and is guided to the optical fiber 60. Therefore, an optical device 1 having better optical coupling efficiency with the external optical fiber 60 than the optical device of the related art is realized.

Figure 13:
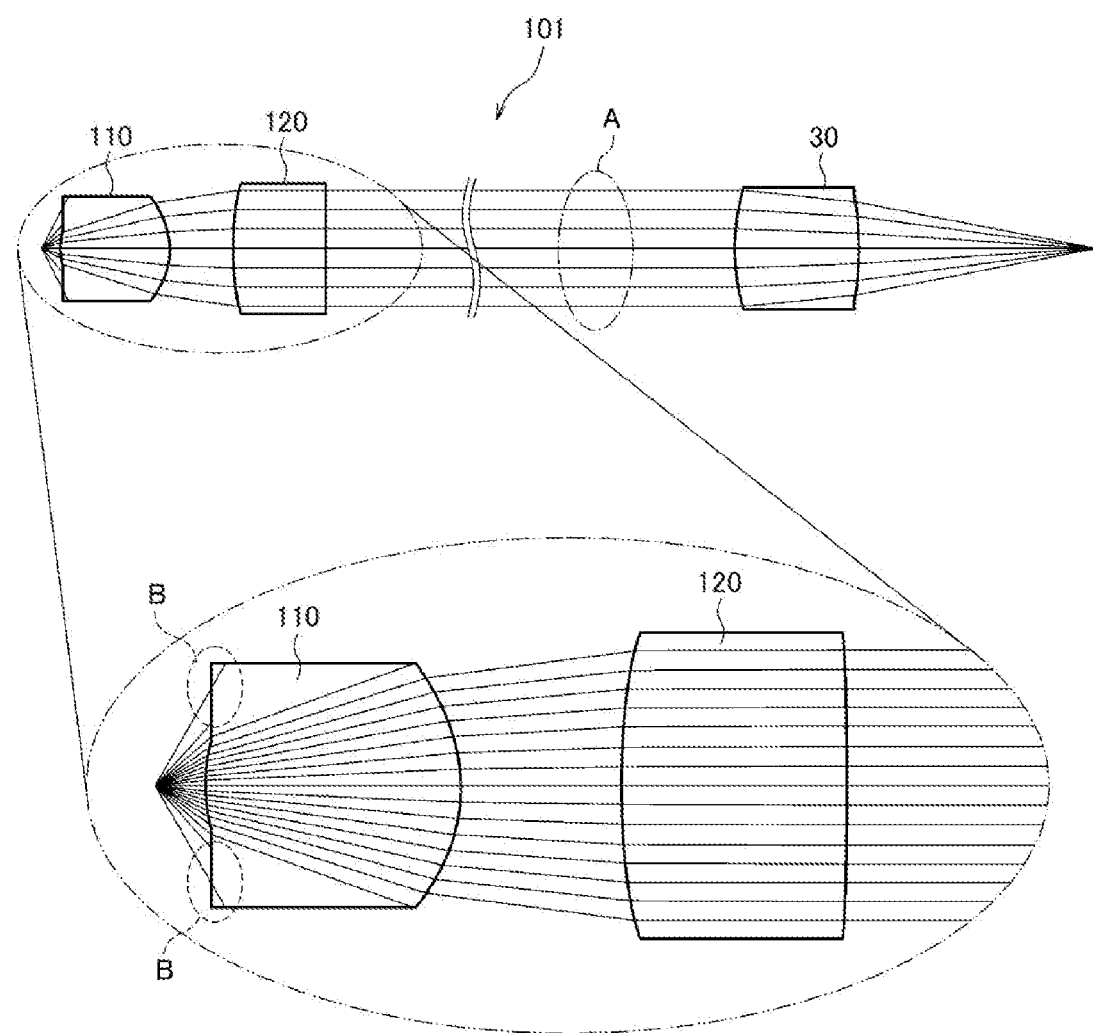
FIG. 13 is a view showing an optical path from an optical element to an optical fiber in the optical device of the related art.

Here, a difference between the optical device according to the embodiment of the present disclosure and the optical device of the related art will be described. FIG. 13 is a view showing an optical path from an optical element to an optical fiber in the optical device of the related art as a model for comparison, and the description of the optical element and the optical fiber is omitted as in FIG. 4. An optical device 101 of the related art also includes a first lens 110, a second lens 120 which is a collimating lens, and a third lens 30 which is a condensing lens. Here, light released from an optical waveguide 41 of an LD chip 40 is guided to the second lens 120 by the first lens 110, is further converted into collimated light A by the second lens 120, is condensed by the third lens 30, and is guided to an optical fiber 60.

In the optical device 101 shown in FIG. 13, a case in which a Gaussian beam having a beam radius $\omega$ of 0.8 µm and a wavelength $\lambda$ of 1.55 µm in the optical waveguide enters the first lens 110 having a numerical aperture NA of 0.65 is shown in the figure. Here, the numerical aperture NA of the optical waveguide 41 is obtained from $NA=\lambda/(\pi \times \omega)$ and is 0.62. As can be seen from a partially enlarged view of FIG. 13, due to the diffusion of the light from the optical waveguide, a vignetting phenomenon in which peripheral light is vignetted occurs in the first lens 110 as shown by a broken line B. In the case of the optical device 101 shown in FIG. 13, a loss of light is 1.0 dB. In general, when the numerical aperture NA of a beam is 0.6 or more (a beam radius $\omega$ is 0.8 µm or less), the spread of light from the optical waveguide becomes large and it becomes difficult for the lens to receive the light. Therefore, a loss of light occurs.

Next, the optical device 1 according to the present embodiment will be described. FIG. 3 is a view for explaining the spread of light from the optical waveguide 41 in the optical device of the present embodiment. In the optical device 1 shown in FIG. 3, as in the case of the optical device 101 of the related art (see FIG. 13), a numerical aperture NA of the optical waveguide 41 is 0.62, and a Gaussian beam having a beam radius of 0.8 µm and a wavelength $\lambda$ of 1.55 µm is emitted from the optical waveguide 41. The first lens 10 is a hemispherical lens having a refractive index n of 1.5 and a radius of curvature R of 50 µm. The second lens 20 is a collimating lens having a numerical aperture NA of 0.65.

As shown in FIG. 3, in the optical device 1 according to the present embodiment, the first lens 10 is formed to be joined to the end surface of the optical waveguide 41 of the LD chip 40. In the optical device 1, since air is not interposed between the LD chip 40 and the first lens 10, the light from the optical waveguide 41 enters the first lens 10 without leakage. In a case in which the refractive index of the first lens 10 is a refractive index n, the spread of the light from the LD chip 40 becomes 1/n times that in air due to the refraction when the light enters the first lens 10. On the other hand, the light that has entered from the center of the first lens 10 which is a hemispherical lens vertically enters the lens surface and is not refracted at the time of emission, and thus the spread is maintained. Therefore, the spread of the light from the LD chip 40 in the entire first lens 10 is suppressed to 1/n times that in air.

In the optical device 1, in a case in which the refractive index n of the first lens 10 is 1.5, the light from the optical waveguide 41 can be guided to the second lens 20 with a loss of 0.06 dB, that is, with almost no loss. As a result, the power of the second lens 20 can be reduced, and the tolerance for misalignment at the time of installing can be increased.

Second Embodiment

In the first embodiment, since the optical axis of the optical waveguide 41 and the optical axis (the central axis) of the first lens 10 are coincide, the light vertically enters the surface of the first lens 10, and the light reflected on the surface follows the entered light in an opposite direction as it is. As a result, the influence of the reflected return light to the optical waveguide 41 may be increased. In the second embodiment, the optical axis of the first lens 10 is shifted from the optical axis of the optical waveguide 41 to reduce the reflected return light on the surface of the first lens 10. Even in a case in which the light enters the first lens 10 from the second lens 20 in a traveling direction, which will be described later in a fifth embodiment, the reflected return light is generated on the surface of the first lens 10, and the influence on the optical waveguide such as the optical fiber is exerted. Therefore, it is desirable to shift the optical axis of the first lens 10 from the optical axis of the optical waveguide 41.

Figure 5:
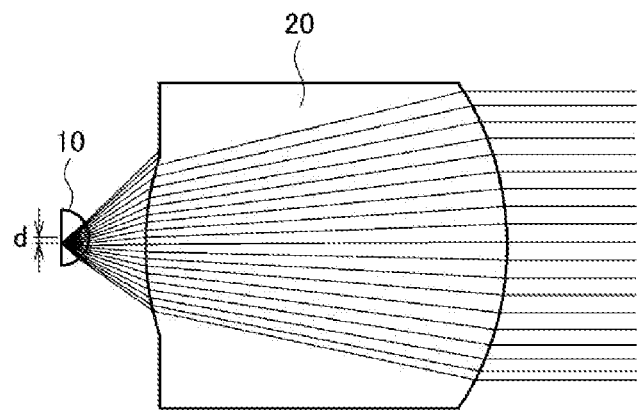
FIG. 5 is a view showing a state when an optical axis of the optical waveguide and an optical axis of a first lens are shifted from each other in the optical device shown in FIG. 1.

FIG. 5 is a view showing a state when an optical axis of the optical waveguide and an optical axis of a first lens are shifted from each other in the optical device shown in FIG. 1. In FIG. 5, the description of the LD chip 40 is omitted for the sake of simplicity. In FIG. 5, the optical axis of the first lens 10 is shifted parallel to the optical axis of the optical waveguide 41 of the LD chip 40 (not shown) by an axis shift amount d in an upper direction in a page of the figure to provide an offset. Accordingly, among the light emitted from the first lens, the light that enters an upper portion in a page of the figure is not converted into collimated light and is vignetted in the second lens 20

Figure 6:
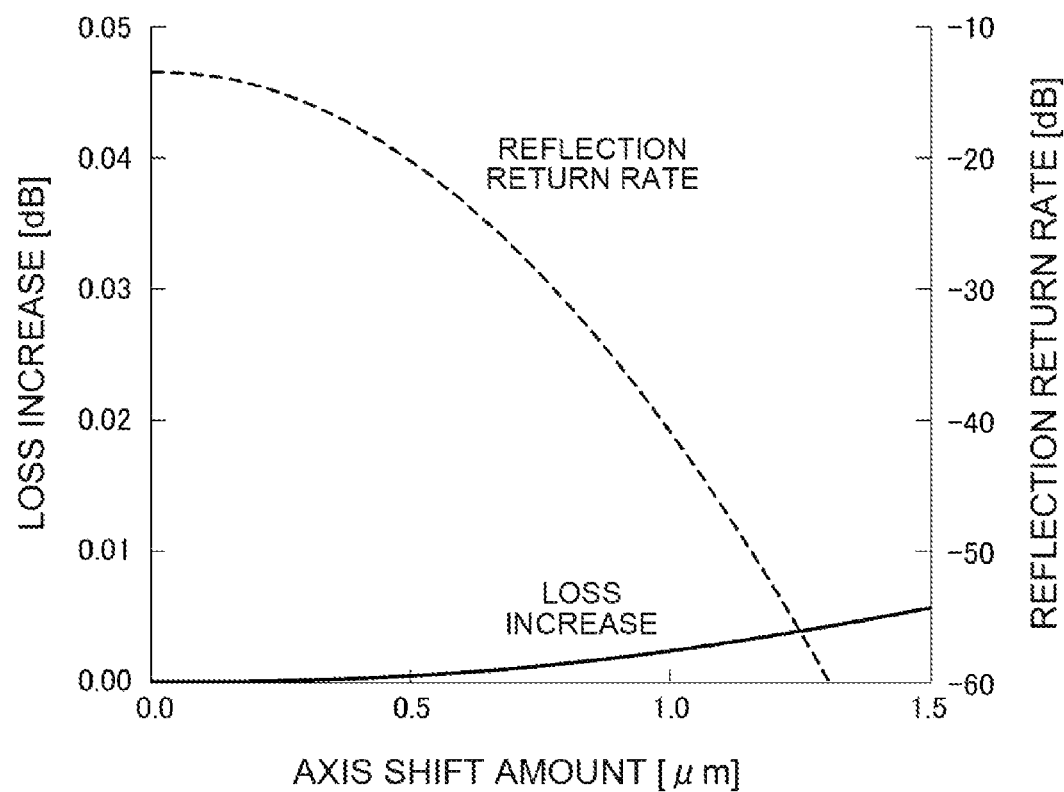
FIG. 6 is a characteristic diagram showing a relationship of a loss increase and a reflection return rate with respect to an axis shift amount between the optical axis of the optical waveguide and the optical axis of the first lens in the optical device shown in FIG. 1.

FIG. 6 is a characteristic diagram showing a relationship of a loss increase and a reflection return rate with respect to an axis shift amount between the optical axis of the optical waveguide and the optical axis of the first lens in the optical device shown in FIG. 1. In FIG. 6, a solid line indicates a loss increase (dB) with respect to the axis shift amount (μm) on a horizontal axis, and a broken line indicates the reflection return rate (dB) with respect to the axis shift amount. The specifications of the optical waveguide 41, the first lens 10, the second lens 20, and the like in the characteristic diagram of FIG. 6 are the same as those described in the first embodiment. As can be seen from FIG. 6, when the axis shift amount d is increased, the loss increase is increased, but the reflection return rate is remarkably reduced. For example, if the axis shift amount d is set to 1 μm or more, the reflected return light can be suppressed to −40 dB or less with almost no loss increase. In view of a relationship with the beam diameter of the optical waveguide 41 of the LD chip 40, by offsetting half of the beam diameter of the optical waveguide 41, that is, the beam radius ω (0.8 μm in the present embodiment) or more, it is possible to sufficiently suppress the reflected return light.

Third Embodiment

In the first embodiment and the second embodiment, the case where the beam radius ω of the optical waveguide 41 is 0.8 μm has been described, but the spread angle of the light beam is increased in inverse proportion to the beam radius ω. Accordingly, even in the configuration of the second embodiment, as the beam radius ω is decreased, the vignetting and loss of light occur in the second lens 20.

Figure 7:
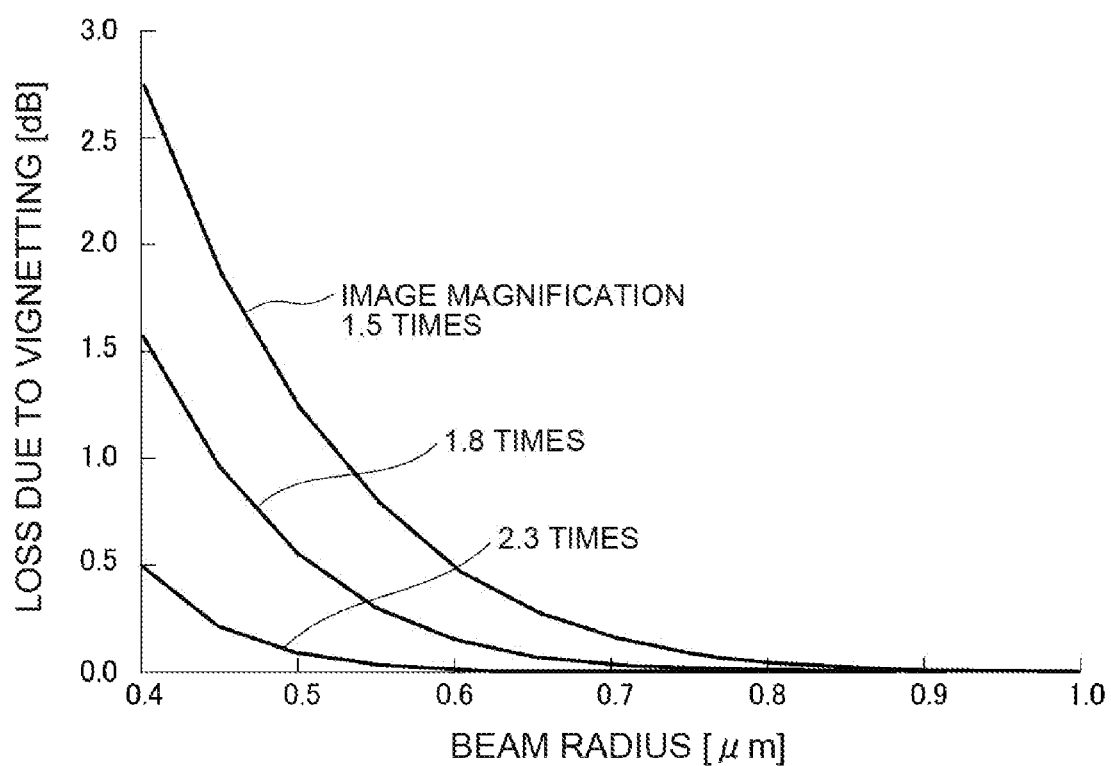
FIG. 7 is a characteristic diagram showing a relationship of a loss due to vignetting with respect to a beam diameter of the optical waveguide in a case in which an image magnification of the first lens is changed in the optical device shown in FIG. 1.

FIG. 7 is a characteristic diagram showing a relationship of a loss due to vignetting with respect to a beam radius of the optical waveguide in a case in which an image magnification of the first lens is changed in the optical device shown in FIG. 1. With reference to FIG. 7, in a hemispherical lens having an image magnification of 1.5 times, the loss is remarkably increased when the beam radius is 0.7 μm or less. For example, when the beam radius is 0.5 μm, the loss exceeds 1.2 dB. On the other hand, it can be seen that, when the image magnification is increased to 1.8 times and 2.3 times, the spread of the light is decreased in inverse proportion, and thus the loss is decreased and it is possible to deal with even a smaller beam radius.

Since the image magnification of the hemispherical lens is determined by a ratio of the refractive index n of the hemispherical lens to the refractive index of air, the image magnification of the hemispherical lens having the refractive index n is n times. Therefore, a first means for increasing the image magnification is to use a hemispherical lens having a large refractive index n for the first lens 10, and the image magnification can be increased in proportion to the refractive index n. A second means is to change the shape of the first lens 10 such that a radius of curvature R of the spherical surface is smaller than a thickness of the lens (a length of the lens in an optical axis direction).

Figure 8:
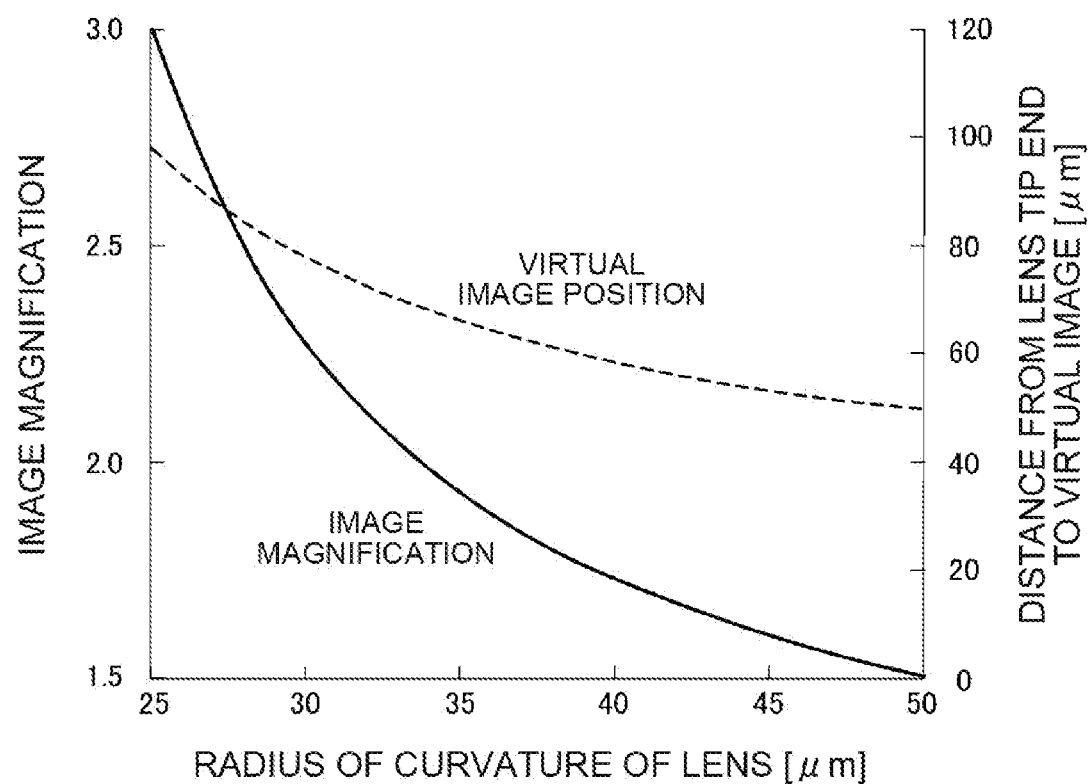
FIG. 8 is a characteristic diagram showing a relationship of an image magnification and a distance from a lens tip end to a virtual image with respect to a radius of curvature of a hemispherical portion in a case in which a thickness of a lens is constant in the optical device shown in FIG. 1.
Figure 9:
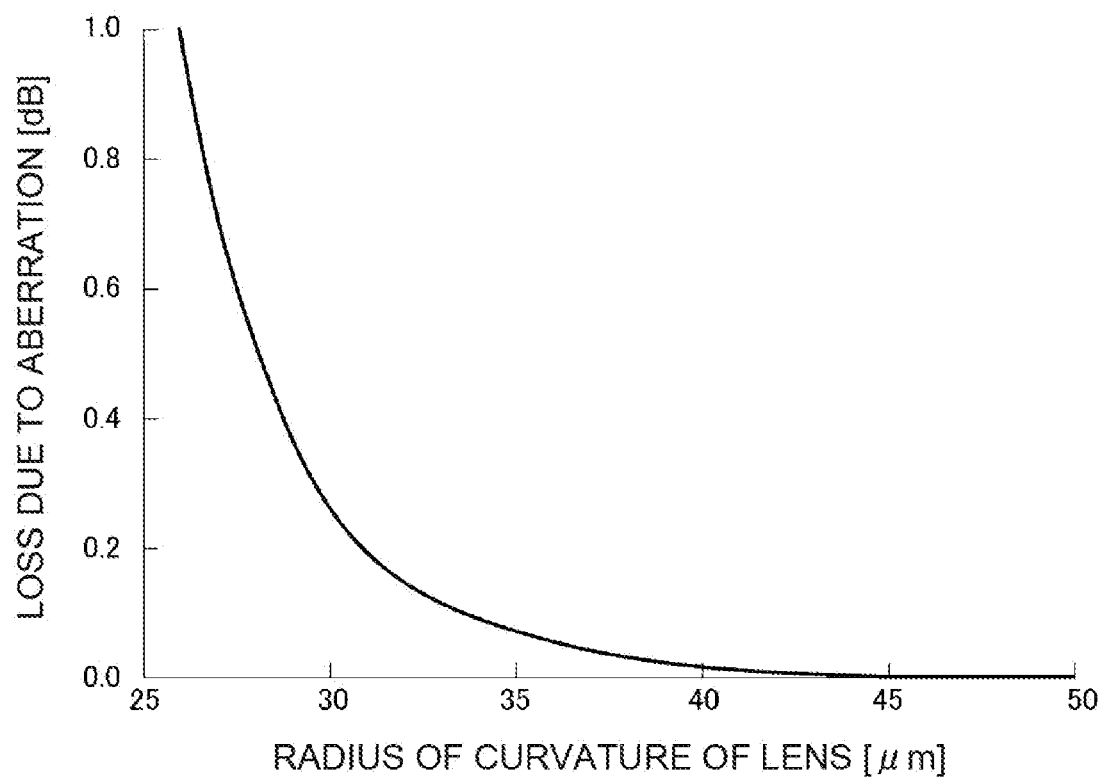
FIG. 9 is a characteristic diagram showing a relationship of a loss due to an aberration with respect to a radius of curvature of the lens in the optical device shown in FIG. 1.
Figure 10:
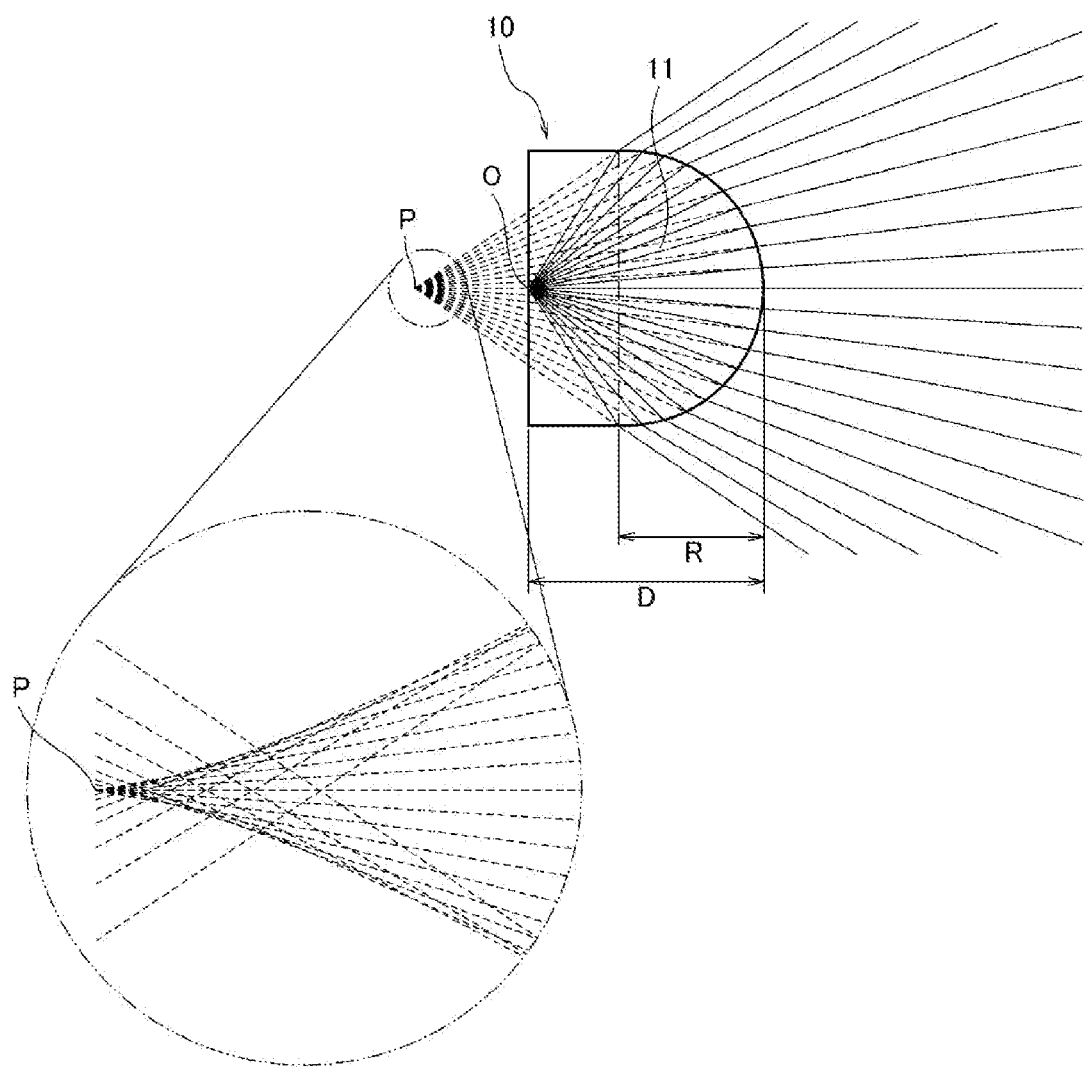
FIG. 10 is a view for explaining a relationship between an aberration of a lens and a virtual image when a thickness of the first lens is increased.

FIG. 8 is a characteristic diagram showing a relationship of an image magnification and a distance from a lens tip end to a virtual image with respect to a radius of curvature of a hemispherical portion in a case in which a thickness of a lens is constant in the optical device shown in FIG. 1. FIG. 9 is a characteristic diagram showing a relationship of a loss due to an aberration with respect to a radius of curvature in the optical device shown in FIG. 1. In FIG. 8, a solid line indicates an image magnification with respect to a radius of curvature (μm) of the lens, and a broken line indicates a distance (μm) from a lens tip end to a virtual image with respect to a radius of curvature (μm) of the lens. FIG. 10 is a view for explaining a relationship between an aberration of a lens and a virtual image when a thickness of the first lens is increased.

FIG. 8 shows a case in which a thickness D (a length in the optical axis direction) of the first lens 10 is constant as 50 μm, and the radius of curvature R of the hemispherical portion 11 is reduced to increase the image magnification. In a case in which the radius of curvature R is 50 μm which is equal to the thickness D of the lens, the first lens 10 becomes a hemispherical lens. FIG. 9 shows a case in which a beam radius ω of the optical waveguide 41 is constant as 0.5 μm. In the third embodiment, the thickness D of the lens of the first lens 10 is larger than the radius of curvature R of the hemispherical portion 11, and thus the shape of the large lens is a cannonball shape as shown in FIG. 10. A point O indicating an entering position of the light from the optical waveguide 41 is a position deviated from the center of the hemispherical portion 11 toward the optical waveguide 41. In FIG. 10, a position of the virtual image is indicated by a point P.

With reference to FIG. 8, it can be seen that the radius of curvature R should be set to 30 μm to increase the image magnification of the first lens 10 by 2.3 times. The position P of the virtual image in this case is at a position of 75 μm from the tip end of the lens. On the other hand, referring to FIG. 9, the smaller a radius of curvature R, the larger a loss due to an aberration. At an image magnification of 2.3 times (a radius of curvature of 30 μm), the loss is 0.29 dB which is larger than the loss due to vignetting. A partially enlarged view shown in FIG. 10 is an enlarged view of the vicinity of the virtual image position and shows that the virtual image is not condensed on one point due to an aberration. As described above, in the present embodiment, since the first lens 10 in which the thickness of the lens is larger than the radius of curvature R of the hemispherical portion 11 is used, it is possible to increase the image magnification, and it is possible to deal with a small beam radius ω. However, in the present embodiment, since a position (a light source) of the light that enters the first lens 10 and the center position of the lens spherical surface are different, a loss due to an aberration occurs, and the smaller a radius of curvature R, the larger a loss due to an aberration.

Fourth Embodiment

Figure 11:
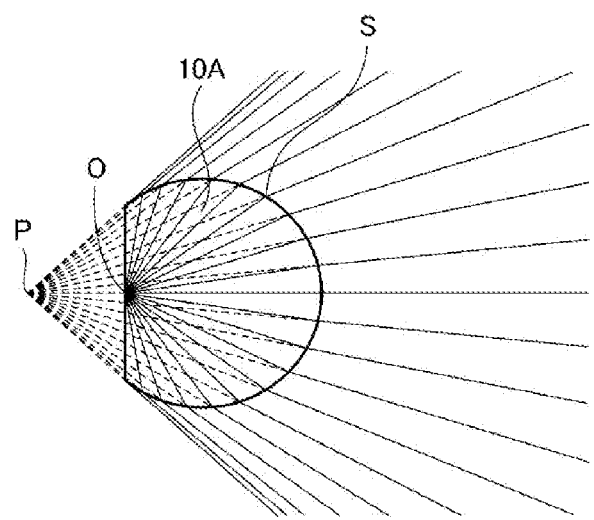
FIG. 11 is a view for explaining an aspherical lens used for the first lens in the optical device shown in FIG. 1.

For suppressing a loss due to an aberration, it is necessary to design an aspherical surface of the first lens 10. FIG. 11 is a view for explaining an aspherical lens used for the first lens in the optical device shown in FIG. 1. In the present embodiment, a property that lengths of optical paths are equal regardless of the paths in a case in which the light emitted from one point is condensed at one point is used as a property of a first lens 10A to condense the light from the light source to one point of the virtual image.

That is, in FIG. 11, assuming that a refractive index of the first lens 10A is a refractive index n, a predetermined position on a surface on adjacent to the LD chip 40 is a point O, and an arbitrary position on a surface of the first lens 10A other than an end surface side of the optical waveguide 41 is a point S, and a position of a virtual image formed by the first lens 10A is a point P, a relationship in which a value obtained by subtracting a distance between the point S and the point P from a value obtained by multiplying a distance between the point O and the point S by the refractive index n is a constant value is formed. If this relationship is expressed by an equation, it is possible to express the relationship by the following equation.

$$n \times \text{distance between points } O \text{ and } S - \text{distance between points } S \text{ and } P = \text{constant value} \quad (1)$$

The first lens 10A shown in FIG. 11 shows a case in which the optical axis of the optical waveguide 41 is orthogonal to the surface of the first lens 10A near the LD chip 40 at the position of the point O. The first lens 10A is designed such that the position point P of the virtual image is located on the optical axis of the optical waveguide 41. In this case, the optical axis of the first lens 10A coincides with the optical axis of the optical waveguide 41, and the shape of the lens can be formed symmetrically with respect to the optical axis. In the first lens 10A, a side to be joined to the end surface of the optical waveguide 41 is formed on a plane orthogonal to the optical axis of the first lens 10A. An area of this plane is smaller than a maximum area of a cross section orthogonal to the optical axis of the first lens 10A. As a result, the first lens 10A is an aberration-free lens having an image magnification of 2.3 times that satisfies the relationship of the equation (1). In the first lens 10A, the loss occurring when the beam radius w of the optical waveguide 41 (not shown) is 0.5 µm is 0.09 dB, but this loss is due to vignetting and not due to an aberration. Further, since the light from the optical waveguide 41 does not vertically enter the lens surface except for the optical axis, the reflection return rate is good as −45 dB even if the optical axis of the first lens 10 is not shifted from the optical axis of the optical waveguide 41. As described above, since the numerical aperture NA of the beam can be reduced in the first lens 10A, the lens design of the second and subsequent lenses becomes easy.

Figure 12A:
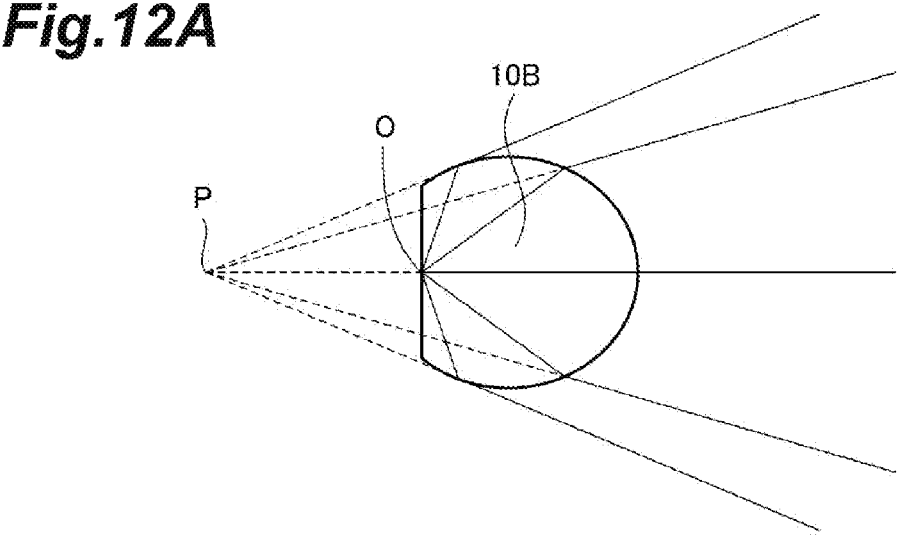
FIG. 12A is a view showing another example of the aspherical lens.
Figure 12B:
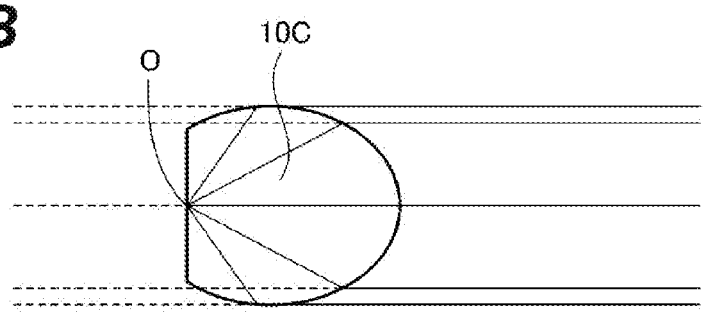
FIG. 12B is a view showing still another example of the aspherical lens.

FIG. 12A is a view showing another example of the aspherical lens, and a first lens 10B shows a case in which the magnitude of the constant value in the equation (1) is smaller than that of the first lens 10A shown in FIG. 11 (larger on a minus side). FIG. 12B is a view showing still another example of the aspherical lens, and a first lens 10C shows a case in which the magnitude of the constant value in the equation (1) is minus infinity. As described above, in the present embodiment, various shapes of the first lens can be selected. The first lens 10A of the present embodiment is less affected by the reflected return light, but as described in the second embodiment, it is possible to further suppress the influence of the reflected return light from the lens surface by shifting the optical axis of the first lens 10A from the optical axis of the optical waveguide 41.

Figure 12C:
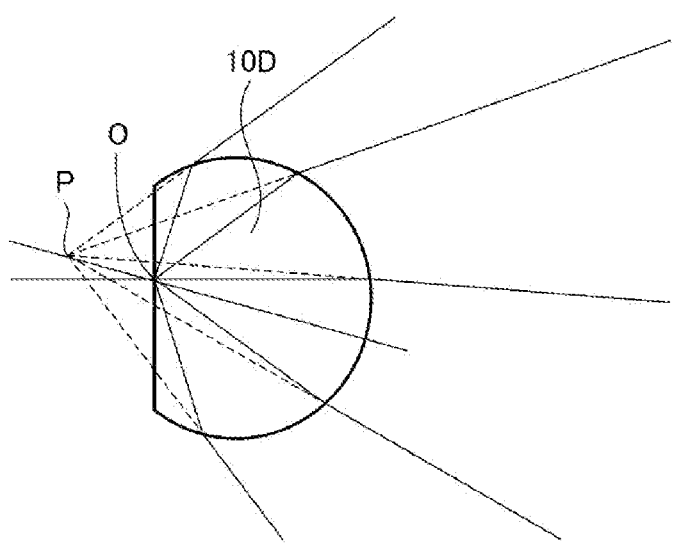
FIG. 12C is a view showing yet another example of the aspherical lens.

Further, in the aspherical lens shown in the present embodiment, the position point P of the virtual image can be located apart from the optical axis of the optical waveguide 41. FIG. 12C is a view showing yet another example of the aspherical lens. A first lens 10D shown in FIG. 12C is designed using equation (1) such that the optical axis of the optical waveguide is orthogonal to the surface of the first lens 10D near the LD chip 40 at the position of the point O, and the position point P of the virtual image of the first lens 10D is located apart from the optical axis of the optical waveguide 41. Therefore, a straight line (the optical axis) connecting the position point O (the position of the light source) in contact with the optical waveguide 41 of the first lens 10D and the position point P of the virtual image intersects the optical axis of the optical waveguide 41 and is deviated from the optical axis of the optical waveguide 41. As described above, in the present embodiment, the aspherical design is possible even in a state in which the optical axis of the first lens 10D is deviated from the optical axis of the optical waveguide. As a result, not only the influence of the reflected return light is suppressed, but also an aberration due to the deviation of the optical axis is eliminated and the loss increase is suppressed.

In the present embodiment, the optical axis of the first lens 10A and the optical axis of the optical waveguide 41 may be shifted from each other as in the second embodiment. In this case, the optical axis of the optical waveguide 41 is orthogonal to the surface near the LD chip 40 at a position other than the point O of the first lens 10A. Further, similarly even in the case of the first lens 10D in which the position point P of the virtual image shown in FIG. 12C is located apart from the optical axis of the optical waveguide 41, the optical axis of the optical waveguide 41 may be orthogonal to the surface near the LD chip 40 at a position other than the point O of the first lens 10D.

Fifth Embodiment

In the first to fourth embodiments described above, the case in which the optical element is the LD chip 40 has been described, but in the present disclosure, the optical element may be a light receiving element having an optical waveguide. In this case, it is possible to obtain an optical device having good optical coupling efficiency. In a case in which the optical element is configured as a light receiving element, the traveling direction of light is opposite to that in the optical devices according to the first to fourth embodiments. That is, to explain with reference to FIG. 4, the light emitted from the optical fiber is converted into the collimated light A by the third lens 30, and the collimated light A is condensed by the second lens 20 to enter the first lens 10. In this optical device, the light that enters the first lens 10 is condensed on the optical waveguide of the light receiving element by the first lens 10. The light receiving element having the optical waveguide used in the optical device of the present embodiment may be an optical modulation element, a waveguide type light receiving element, or an optical amplification element.

In the present embodiment, as an example of the optical device, an optical system in which the LD chip 40 which is an optical element and the optical fiber 60 are optically coupled has been described above. However, as an optical device, for example, an optical system between optical elements such as between a light emitting element and a light receiving element can also be applied. In this case, the first lens 10 and the second lens that is optically coupled with the first lens may are provided on an end surface of an optical waveguide of the light emitting element, and the first lens 10 and the second lens that is optically coupled with the first lens may also be provided on an end surface of the optical waveguide of the light receiving element. Then, coherent light may be guided between the second lenses 20. Further, as the material of the first lens, glass may be used in stead of to the resin.

What is claimed is:

1. An optical device comprising:
   an optical element provided on a base;
   a first lens covering the optical element to emit light emitted from the optical element;
   and
   a second lens optically coupled with the first lens to convert the light emitted from the first lens into collimated light, the second lens being provided on the base,
   wherein the first lens is configured to form a virtual image on the optical element side,
   wherein the first lens includes a plane and a curved surface,
   wherein the plane of the first lens excludes the curved surface and faces the optical element, and
   wherein the plane of the first lens is joined to an end surface of the optical waveguide in the optical element, the plane being orthogonal to the optical axis of the first lens.

2. The optical device according to claim 1, further comprising:
   a third lens configured to condense the collimated light emitted from the second lens; and
   an optical fiber optically coupled with the third lens to receive the condensed light emitted from the third lens.

3. The optical device according to claim 1,
   wherein the optical element includes at least one of a laser element, an optical modulation element, and an optical amplification element.

4. An optical device comprising:
   an optical element provided on a base;
   a first lens covering the optical element to condense incident light that enters the optical element; and
   a second lens optically coupled with the first lens to convert collimated light into incident light that enters the first lens, the second lens being provided on the base,
   wherein the first lens is configured to form a virtual image on the optical element side,
   wherein the first lens includes a plane and a curved surface,
   wherein the plane of the first lens excludes the curved surface and faces the optical element, and
   wherein the plane of the first lens is joined to an end surface of the optical waveguide in the optical element, the plane being orthogonal to the optical axis of the first lens.

5. The optical device according to claim 4, further comprising:
   a third lens configured to make the collimated light enter the second lens; and
   an optical fiber optically coupled with the third lens to emit incident light that enters the third lens.

6. The optical device according to claim 4,
   wherein the optical element includes at least one of an optical modulation element, a waveguide type light receiving element, and an optical amplification element.

7. The optical device according to claim 1,
   wherein the first lens is an aspherical lens having a curved surface protruding on a side opposite to the optical element, and
   wherein a region of the first lens joined to the end surface of the optical waveguide of the optical element is formed in a plane orthogonal to an optical axis of the first lens, and an area of the plane is smaller than a maximum area of a cross section of the first lens orthogonal to an optical axis of the optical waveguide.

8. The optical device according to claim 4,
   wherein the first lens is an aspherical lens having a curved surface protruding on a side opposite to the optical element, and
   wherein a region of the first lens joined to the end surface of the optical waveguide of the optical element is formed in a plane orthogonal to an optical axis of the first lens, and an area of the plane is smaller than a maximum area of a cross section of the first lens orthogonal to an optical axis of the optical waveguide.

9. The optical device according to claim 1,
   wherein the first lens is configured to satisfy the following equation:
   (a refractive index n of the first lens x each distance between the point O and each point S)—each distance between each point S and the point P=constant value,
   in which, the point O is a predetermined position on a surface of the first lens adjacent to the optical element, each point S is an arbitrary position on a surface of the first lens other than the surface adjacent to the optical element, and the point P is a position of the virtual image formed by the first lens.

10. The optical device according to claim 9,
    wherein an optical axis of the optical waveguide is orthogonal to the surface adjacent to the optical element at a position of the point O of the first lens, and the position point P of the virtual image of the first lens is on the optical axis of the optical waveguide.

11. The optical device according to claim 9,
    wherein the optical axis of the optical waveguide is orthogonal to the surface adjacent to the optical element at a position other than the point O.

12. The optical device according to claim 4,
    wherein the first lens is configured to satisfy the following equation:
    (a refractive index n of the first lens x each distance between the point O and each point S)—each distance between each point S and the point P=constant value,
    in which, the point O is a predetermined position on a surface of the first lens adjacent to the optical element, each point S is an arbitrary position on a surface of the first lens other than the surface adjacent to the optical element, and the point P is a position of the virtual image formed by the first lens.

13. The optical device according to claim 1,
    wherein the first lens includes at least a hemispherical portion on a side where the first lens is optically coupled with the second lens.

14. The optical device according to claim 13,
wherein a thickness of the first lens in an optical axis direction is larger than a radius of curvature of the hemispherical portion.

15. The optical device according to claim 13,
wherein an optical axis of the first lens is offset with respect to an optical axis of the optical waveguide of the optical element by half or more of a beam diameter of the optical waveguide of the optical element.

16. The optical device according to claim 4,
wherein the first lens includes at least a hemispherical portion on a side where the first lens is optically coupled with the second lens.

17. The optical device according to claim 1,
wherein the first lens is made of glass or a resin.

18. The optical device according to claim 4,
wherein the first lens is made of glass or a resin.

19. An optical device comprising:
an optical element provided on a base;
a first lens covering the optical element to emit light emitted from the optical element; and
a second lens optically coupled with the first lens to convert the light emitted from the first lens into collimated light, the second lens being provided on the base,
wherein the first lens includes a plane and a curved surface,
wherein the plane of the first lens excludes the curved surface and faces the optical element,
wherein the plane of the first lens is joined to an end surface of the optical waveguide in the optical element, the plane being orthogonal to the optical axis of the first lens, and
wherein the first lens is configured to satisfy the following equation:
(a refractive index n of the first lens x each distance between the point O and each point S)—each distance between each point S and the point P=constant value,
in which, the point O is a predetermined position on a surface of the first lens adjacent to the optical element, each point S is an arbitrary position on a surface of the first lens other than the surface adjacent to the optical element, and the point P is a position of the virtual image formed by the first lens.

* * * * *